US012678719B2

(12) United States Patent
Jedliński et al.

(10) Patent No.: US 12,678,719 B2
(45) Date of Patent: *Jul. 14, 2026

(54) FILTER VALVE ASSEMBLY

(71) Applicant: Hamilton Sundstrand Corporation, Charlotte, NC (US)

(72) Inventors: Marek Paweł Jedliński, Wrocław (PL); Maciej Bujewicz, Wrocław (PL)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 341 days.

This patent is subject to a terminal disclaimer.

(21) Appl. No.: 18/348,465

(22) Filed: Jul. 7, 2023

(65) Prior Publication Data

US 2024/0033665 A1 Feb. 1, 2024

(30) Foreign Application Priority Data

Jul. 28, 2022 (EP) .................................... 22461585

(51) Int. Cl.
*B01D 35/15* (2006.01)
*B01D 35/147* (2006.01)
*B01D 35/157* (2006.01)

(52) U.S. Cl.
CPC ....... *B01D 35/1573* (2013.01); *B01D 35/147* (2013.01); *B01D 2201/16* (2013.01)

(58) Field of Classification Search
CPC .............. B01D 35/1573; B01D 35/147; B01D 2201/16; B01D 35/153
See application file for complete search history.

(56) References Cited

U.S. PATENT DOCUMENTS 3,235,085 A    2/1966   Humbert, Jr.
3,262,563 A    7/1966   Pall
4,322,290 A    3/1982   Carl
4,615,800 A    10/1986  Stifelman et al.
(Continued)

FOREIGN PATENT DOCUMENTS

CN    109253957 A    1/2019
DE    4328772 A1     3/1994
(Continued)

OTHER PUBLICATIONS

Abstract of CN109253957, Published: Jan. 22, 2019, 1 page.
European Search Report for Application No. 22461585.6, mailed Jan. 12, 2023, 10 pages.

*Primary Examiner* — Waqaas Ali
(74) *Attorney, Agent, or Firm* — CANTOR COLBURN LLP

(57) ABSTRACT

A filter assembly includes a manifold having a fluid inlet and a fluid outlet, a filter housing having a filter medium provided therein, the filter medium defining an inner filter chamber and defining an outer filter chamber between the filter medium and the filter housing, the filter housing being removably attached to the manifold so as to provide a fluid flow path from the inlet into the inner filter chamber, through the filter medium into the outer chamber and out of the outlet; characterised by the filter assembly further comprising a valve assembly mounted inside the manifold, the valve assembly comprising a shut off valve piston and a shut off valve spring arranged in engagement with the valve piston to bias the valve piston into a first position.

18 Claims, 5 Drawing Sheets

(56) References Cited

U.S. PATENT DOCUMENTS

| | | | |
|---|---|---|---|
| 4,721,563 A | 1/1988 | Rosaen | |
| 5,284,579 A | 2/1994 | Covington | |
| 8,316,880 B2 | 11/2012 | Grosskopf et al. | |
| 9,453,462 B2 | 9/2016 | Rickis | |
| 2003/0127384 A1* | 7/2003 | Kapur .................. | B01D 35/147 |
| | | | 210/416.5 |
| 2008/0083664 A1* | 4/2008 | Bontaz ................. | B01D 27/103 |
| | | | 123/196 R |
| 2018/0333664 A1* | 11/2018 | Sander ................. | B01D 35/147 |
| 2021/0332779 A1 | 10/2021 | Jedlinski et al. | |

FOREIGN PATENT DOCUMENTS

| | | | |
|---|---|---|---|
| DE | 102019122099 A1 | 3/2020 |
| WO | 2020043511 A1 | 3/2020 |

* cited by examiner

FILTER VALVE ASSEMBLY

CROSS REFERENCE TO RELATED APPLICATION

This application claims priority to European Patent Application No. 22461585.6 filed Jul. 28, 2022, the entire contents of which is incorporated herein by reference.

TECHNICAL FIELD

The present disclosure is concerned with a valve assembly for a filter assembly such as, but not limited to, filters for fuel or oil or lubricant in machines or vehicles, e.g. a fuel filter in a vehicle or an aircraft.

BACKGROUND

Filters are provided in various applications to filter fluid flowing along a fluid flow path in order, for example, to remove particles or contaminants from the fluid. The present disclosure is concerned with the type of filter having a fluid inlet and a fluid outlet and a filter path between the inlet and the outlet, wherein the filter path passes through a filter medium arranged to remove the material to be filtered from the fluid before it arrives at the outlet. Such filters find use in e.g. vehicle fuel systems, where fuel is drawn from a reservoir by a pump and delivered to the engine. Filters are provided in the flow path to remove any particulate matter or debris and to ensure that the fuel reaching the engine is as clean as possible to avoid damage to the engine and permit optimal engine performance. Such filter assemblies may comprise a manifold with an inlet and outlet for connection to the fuel lines and a filter material. This may be provided in a filter cartridge removably attached to the manifold. Filters are also used to filter lubricant fluid e.g. oil and whilst the assembly of the disclosure is described in relation to fuel supply systems, this is by way of example only and the principles may apply equally to filters for lubricant or other fluids. In vehicles, and particularly in aircraft, the effectiveness and reliability of the filters is important for performance, efficiency and safety.

Over time, the filter material may become clogged presenting an impedance to the flow of fluid through the filter. To avoid the engine being cut off from the fuel supply when the filter medium is clogged, most fuel supply systems will provide a way to bypass the filter medium in the event of it becoming clogged since it is important for the engine to receive some fuel, even if it contains debris, rather than no fuel at all. The bypass system will allow fuel to flow to the engine until such time that the filter material can be replaced e.g. by removing and replacing the filter cartridge.

Current filter bypass systems tend to be large and complex and this adds considerably to the cost, weight and size of the filter assembly.

Further, as mentioned above, when the filter medium becomes clogged or has exceeded its useful or permitted life, it needs to be removed and replaced. Conventionally, this requires the fuel system, and therefore the engine, to be switched off while the filter medium is removed, leading to undesirable downtime.

There is a need for a bypass system for a filter assembly that is simple, small and lightweight whilst maintaining reliability. There is also a need for an automatic shut-off system that allows a filter to be removed and replaced without the need to shut-off the entire fuel system and to avoid leakage during removal of the filter cartridge.

SUMMARY

The assembly according to this disclosure is a valve assembly comprising a bypass valve and a shut-off valve that are integrated inside the housing or manifold of a filter assembly and that are automatically actuated.

According to an aspect of the disclosure, there is provided a filter assembly comprising: a manifold having a fluid inlet and a fluid outlet, a filter housing having a filter medium provided therein, the filter medium defining an inner filter chamber and defining an outer filter chamber between the filter medium and the filter housing, the filter housing being removably attached to the manifold so as to provide a fluid flow path from the inlet into the inner filter chamber, through the filter medium into the outer chamber and out of the outlet; characterised by the filter assembly further comprising a valve assembly mounted inside the manifold, the valve assembly comprising a shut off valve piston and a shut off valve spring arranged in engagement with the valve piston to bias the valve piston into a first position, the valve assembly further comprising an adaptor ring located between the shut off valve piston and the filter housing and provided with an annular outlet seal, and wherein the shut off valve piston is provided with a radially extending flange and an inner piston wall configured such that as the filter housing is being detached from the manifold, the shut off valve spring expands to move the shut off valve piston to a shut off position whereby the piston flange is in sealing engagement with the adaptor ring and the outlet seal, and the inner piston wall is in sealing engagement with inlet seals such that flow from the fluid inlet and the fluid outlet is shut off from entering the filter housing, the valve assembly further comprising a bypass channel formed in the shut off valve piston between the fluid inlet and the fluid outlet and a bypass valve assembly comprising a bypass valve spool and a bypass valve spring, wherein in its default state, the bypass valve spring biases the bypass valve spool across the bypass channel to prevent flow from the fluid inlet to the fluid outlet via the bypass channel and wherein, when the pressure differential across the bypass valve spool exceeds a predetermined threshold, the pressure acting on the bypass valve spool causes the bypass valve spool to move against the bias of the bypass valve spring and to move away from the bypass channel to open the bypass channel and allow the flow of fluid from the fluid inlet to the fluid outlet via the bypass channel.

Also disclosed is a fuel filter, a method of filtering fluid and a method of detaching the filter housing from the manifold.

Preferred embodiments of the invention will now be described in more detail, by way of example only, with reference to the drawings.

DETAILED DESCRIPTION

Figure 1:
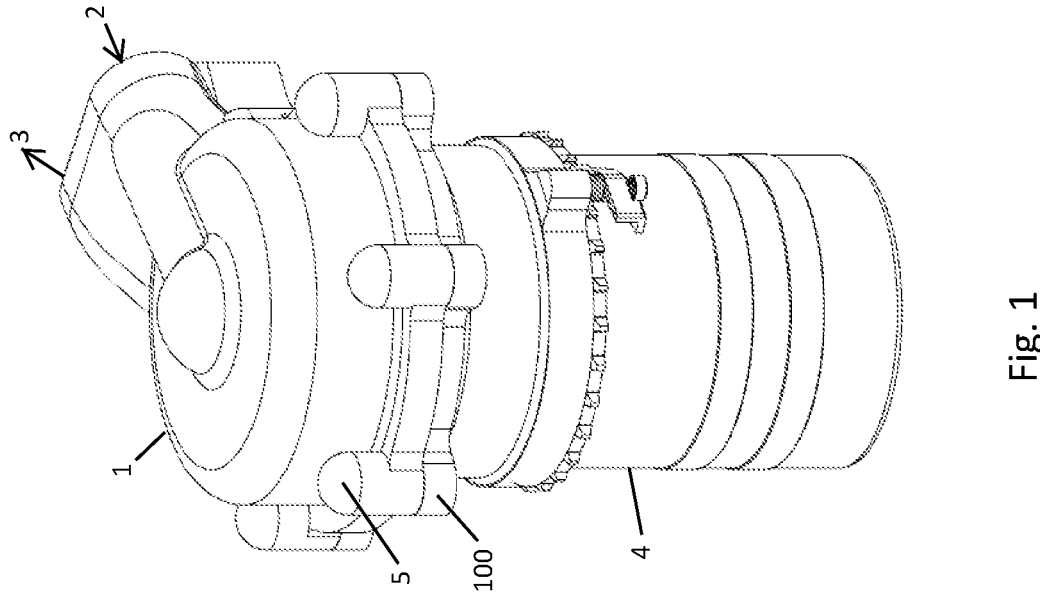
FIG. 1 is a perspective view of a filter assembly.

FIG. 1 shows a filter assembly such as those used in fuel systems or the like. Such filters may be placed between the fuel reservoir and the fuel pump and/or between the pump and the engine, to remove debris, particulate matter etc. from the fuel before it reaches the engine. The outer shape and structure of the filter is as is known in the field and is designed to fit in a fuel supply system of the vehicle/aircraft etc. The aim of the present disclosure is to provide a by-pass and shut off system that can be integrated into such a filter assembly without changing the design or the envelope of the exterior of the assembly.

The filter assembly includes a filter manifold 1 having a fluid inlet 2 and a fluid outlet 3. The inlet 2 is configured to be connected to a fluid line from the reservoir or pump (not shown) supplying fluid/fuel to be filtered. The following description will refer to a fuel filter, but it should be understood that the fluid could be other than fuel and reference to fuel is by way of example only.

The outlet 3 is configured to be connected to a fluid line for providing the filtered fluid to the pump (if the filter is between the reservoir and the pump) or to the end user of the fluid e.g. the engine (if the filter is between the pump and the engine). The manifold 1 is attached to a filter canister or bowl 4 by a connector or adapter 100, which houses the valve assembly described further below, and fasteners 5. A threaded connector 101 is provided between the connector and the bowl 4. As will be described further below with reference to the other drawings, fluid provided to the filter inlet passes from the manifold 1 into the filter canister or bowl 4. The filter bowl 4 contains a filter medium 6 which may be e.g. in the form of a cartridge fitted into the bowl. The filter medium 6 which may be e.g. paper or other known filter material is formed to define an inner chamber 7. An outer chamber 8 is defined between the filter medium 6 and the inner wall 4' of the filter bowl 4. Fluid from the inlet, passing into the filter, is directed into the inner chamber 7. Due to the pressure of the pump and the build-up of pressure in the inner chamber the fluid is forced outwards through the filter medium 6 into the outer chamber 8 and is then forced up to and out from the outlet 3. This is known and standard for such filter assemblies.

As mentioned above, problems can arise when the filter medium 6 becomes clogged or defective such that the fluid in the inner chamber 7 is not able to pass through the filter medium into the outer chamber and to the outlet. The fluid (fuel) would then not reach the engine.

Further, when the filter medium needs replacing, with known assemblies, the fluid supply needs to be cut off to prevent fluid flowing into the inlet so that the bowl 4 can be disconnected from the manifold without fluid leakage, and replaced with new filter medium and reattached before the fluid flow can be re-started.

According to this disclosure, a valve assembly is provided to regulate fluid flow when it cannot pass through the filter medium. The valve assembly is integrated into and inside the manifold of the filter assembly.

Figure 3:
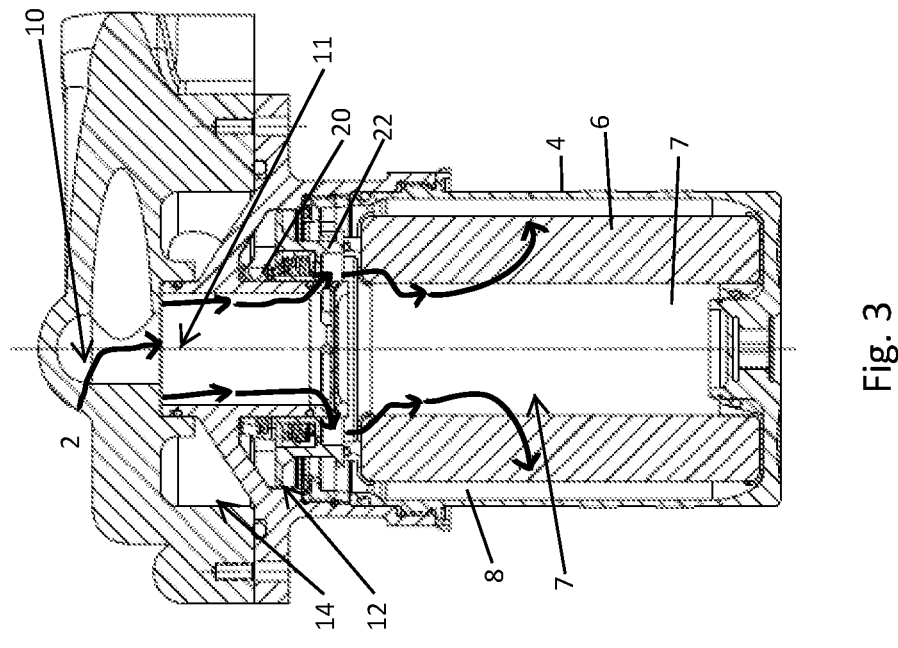
FIG. 3 shows the flow through the filter assembly in normal operation.

In normal operation, the fluid e.g. fuel flows into the inlet 2 in the manifold 1, as best seen by the arrows in FIG. 3. The fuel flows into a supply chamber 10 and along a supply channel 11, from where it flows into the inner chamber 7 of the filter. The fuel flows, under pressure of the pump, through the filter medium 6, where debris or contaminants are filtered from the fluid and retained in the filter medium 6. The filtered fluid then flows from the outer chamber 8 to an outlet channel 12 and out of the filter via the outlet chamber 14 and the outlet 3 of the manifold 1.

As mentioned above, the filter can become clogged and will, after a while, need to be removed and replaced. The valve assembly of this disclosure, as described in more detail below, acts to direct the fuel via a bypass channel 13 in the event that the filter becomes clogged, as indicated by an excessive pressure differential between valve control areas (as described further below and due to the pressure in the inner chamber increasing because the flow through the filter medium is hindered), thus bypassing the filter medium. This ensures that in such an event, fuel will continue to be provided to e.g. the engine even in the event that the filter is not usable. Of course, the output fuel will not be filtered, but some (unfiltered) fuel is preferable to no fuel at all.

The valve assembly also operates to shut off fuel flow through the filter in the event that the filter bowl 4 is removed e.g. for maintenance, so as to prevent fuel leakage. The shut off function shuts off the supply channel and, optionally, may also shut off the outlet chamber.

The valve assembly is located entirely within the envelope of the filter defined by the manifold, the connector and the filter bowl, and comprises a preloaded shut-off valve spring 20, a shut-off valve piston 22 and a bypass valve, comprising a bypass spool 120 and bypass spring 122, as will be described below.

The operation of the valve assembly provides both a bypass function and a shut off function using the components mounted within the envelope of the adapter 100.

Figure 2:
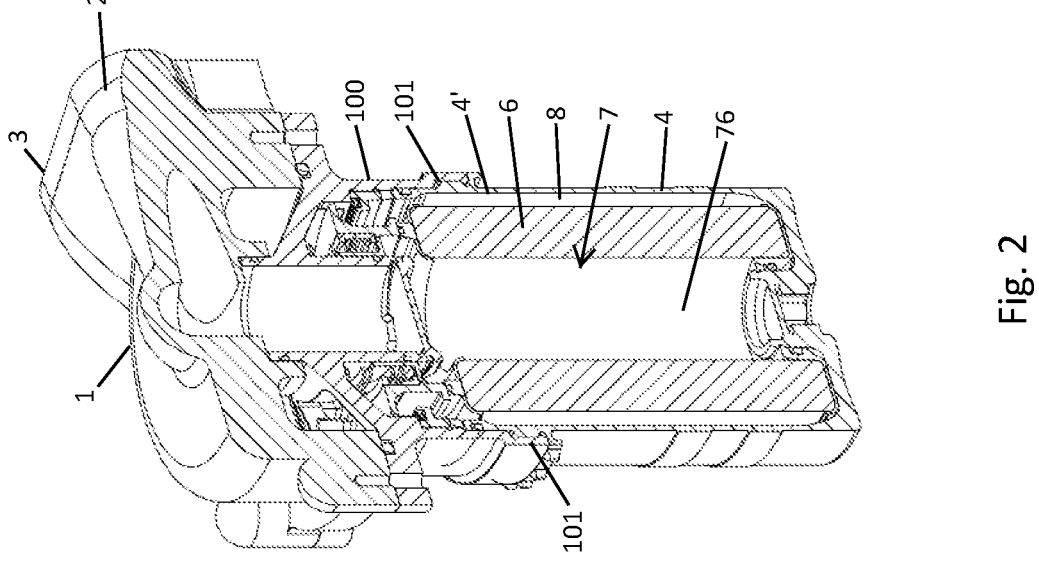
FIG. 2 shows a sectional view of an assembly according to this disclosure.
Figure 4:
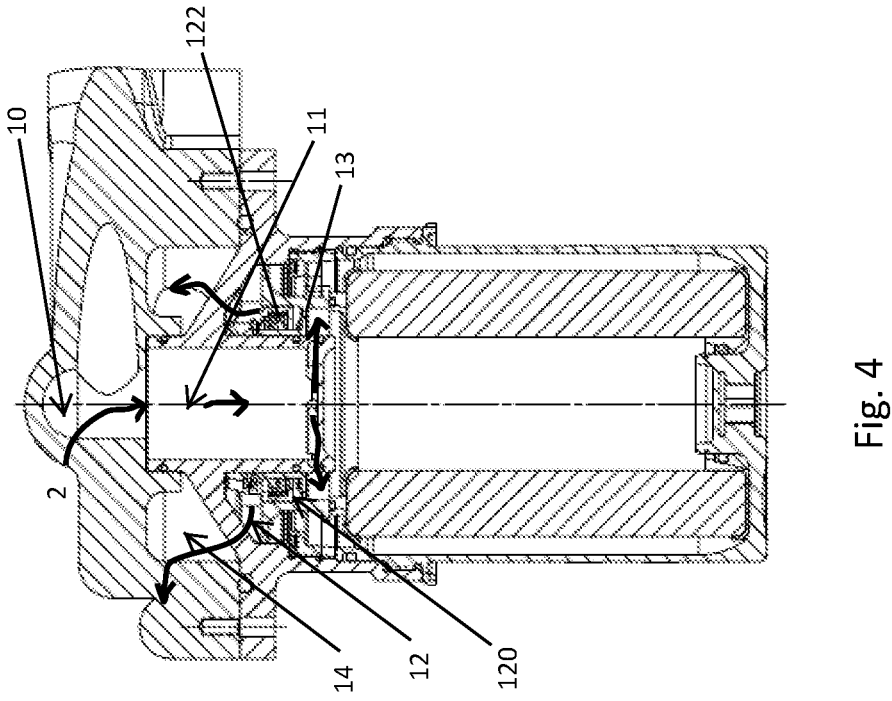
FIG. 4 shows the flow through the filter assembly in bypass operation.

The valve assembly includes the shut-off valve piston 22 mounted within the adapter 100 around the supply channel, the lower end of the piston engaging the filter cartridge. The shut-off spring 20 is biased between the shut-off valve piston 22 and the supply channel. When the filter cartridge is fastened to the adapter 100, the spring 20 is compressed as shown in FIGS. 2 to 4. The piston 22 is provided with a radially extending flange 23 that, in a closed position, abuts against an adapter ring 25 provided around the interior of the adapter 100 at the interface of the adapter and the filter bowl 4. A seal 27, e.g. a lip seal, is provided around the adaptor ring 25 such that when the piston flange 23 abuts against the adapter ring 25 it comes into sealing engagement with the seal 27.

Seals, e.g. O-rings 35, 36 are provided at various locations in the system to prevent leakage of the fluid flowing through the system. One of these seals 36 is provided where the filter medium 6 fits to the bottom of the filter bowl 4.

The bypass valve is provided within the shut off valve piston 22 to control flow between the supply channel and the outlet channel as described further below. More specifically, the shut off piston 22 defines a U-shaped recess, in the bottom of which is provided the bypass channel 13, and between the sides of which are mounted the spool and spring of the bypass valve.

The bypass operation will now be described in more detail with reference to FIGS. 3 and 4. In normal operating conditions, as shown in FIG. 3, shut-off valve piston 22 is in its open state in which the shut-off valve spring 20 is compressed biasing the flange 23 away from the adapter ring 25 so that fluid flows from the inlet through the supply channel, through the filter into the outlet channel, then out through the outlet into the system. The bypass channel 13 is formed through the shut off valve piston. In normal operation, this bypass channel is blocked or closed by the bypass valve, located within the shut off valve piston, being in its default state. In the default state, the bypass spool 120 is biased by the bypass spring 122 against the shut off piston where the bypass channel is provided, such that the bypass spool covers and therefore closes the bypass channel 13. With the bypass channel closed, fluid in the supply channel cannot flow through this channel into the outlet channel and, instead, all of the fluid is directed into the filter through which it passes into the outlet as described above.

Figure 5:
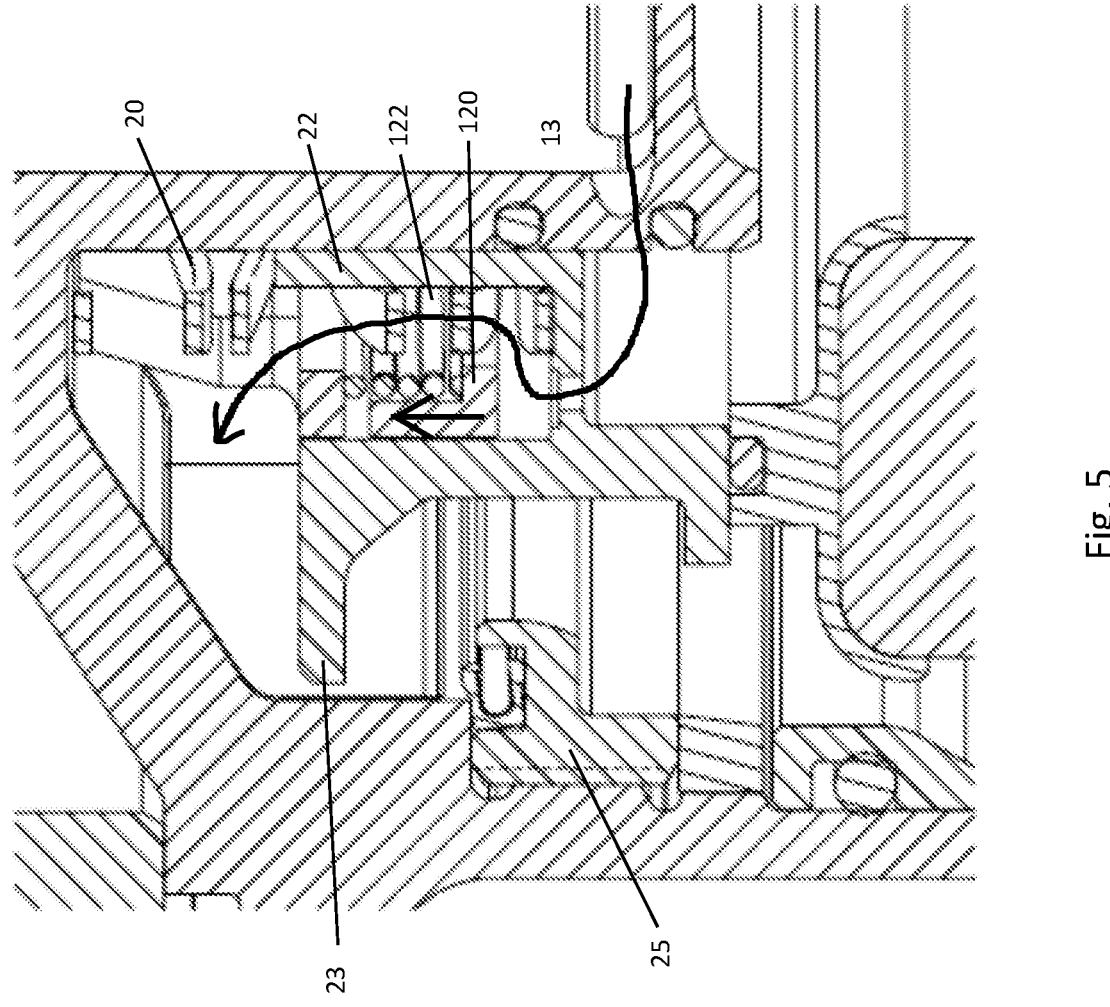
FIG. 5 is a close-up view of the valve assembly of FIG. 4.

If, however, the filter cartridge becomes clogged, preventing the normal flow of fluid through the filter medium, the pressure drop across the filter cartridge (i.e. between the supply channel and the outlet channel) will increase. If the pressure in the inner chamber 7 becomes excessive and so the pressure differential exceeds a predetermined threshold (the cracking pressure) forces are generated on the surfaces of the bypass spool 120 and the relatively higher pressure on the side of the bypass spool facing the bypass channel exceeds the bias force of the bypass spring 122 that is biasing the bypass spool against the bypass channel and forces the bypass spool to move away from the bypass channel against the force of the bypass spring, compressing the spring. The bypass channel is then open, which provides a passage from the direct flow of fluid from the inlet to the outlet, via the bypass channel, without passing through the filter medium, as seen in FIG. 4. In other words, fuel entering the inlet is thus directed, as shown by the arrows in FIG. 4, from the supply chamber through the bypass channel 13, from where it flows to the outlet chamber and to the outlet 3 without passing through the filter medium 6. The bypass valve can be more clearly seen in the detail shown in FIG. 5.

When the pressure difference decreases again, the bypass spring will return, under its own spring bias, back to the default position, and accordingly forces the bypass spool back to its default position covering the bypass channel, which is then closed between the supply channel and the outlet channel.

The valve assembly is also configured to perform a shut off function that shuts off fuel flow when the filter bowl 4 is removed from the manifold 1 e.g. for maintenance. The shut off function is described with reference to FIGS. 6A to 6C and 7.

Figure 7:
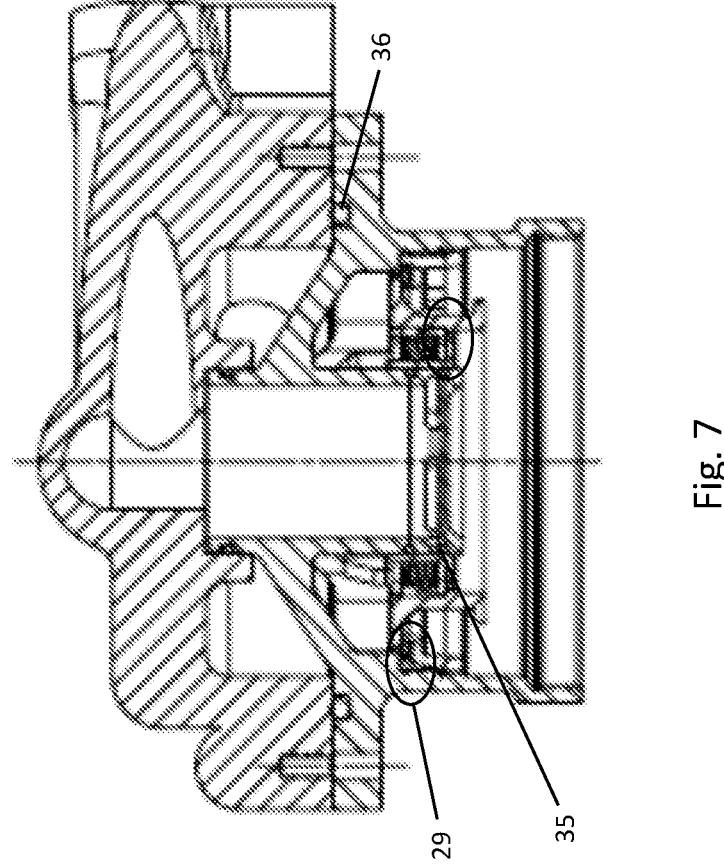
FIG. 7 shows the seals for the shut off function in close-up.

FIG. 7 shows in detail the valve assembly components that cooperate to provide the shut off function. The shut off valve components are arranged within the connector around the supply channel 11. The shut off components include an axially movable shut off valve piston 22, and a shut off valve spring 20 for axially moving the shut off valve piston 22. An inlet seal 26 is provided between the shut off valve piston 22 and the inlet/supply channel 11. This may be a knife edge seal or O ring seal such as a ring of e.g. Teflon or the like to provide axial sealing. An outlet seal 29 is provided between the shut off valve piston 22 and the adapter ring. In the example shown, this is a lip seal and provides axial sealing. Other types of seal can also be envisaged to provide the required axial sealing at the inlet and outlet. What is important is then when the shut off valve is in the closed position (as described further below) both the inlet and outlet are sealed to avoid any fluid leakage at either the inlet or the outlet.

Figure 6C:
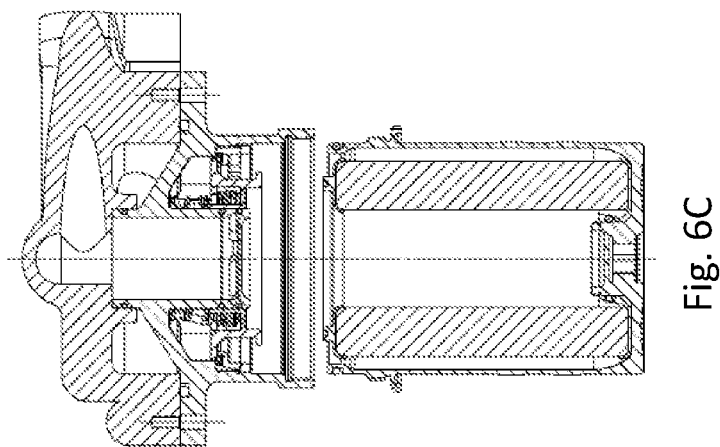
FIGS. 6A, 6B and 6C show operation of the shut off valve function.
Figure 6B:
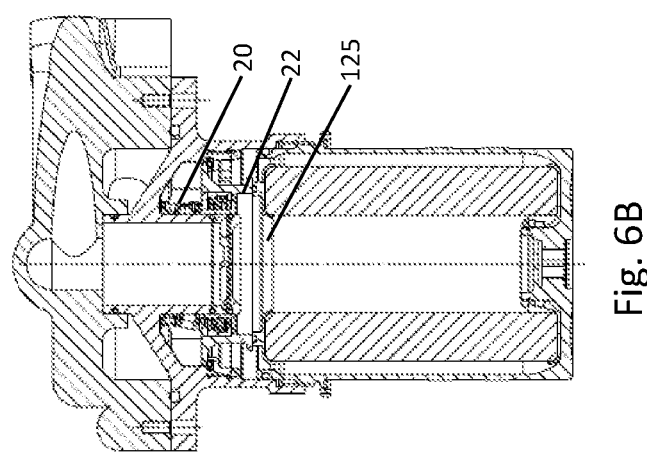
Figure 6A:
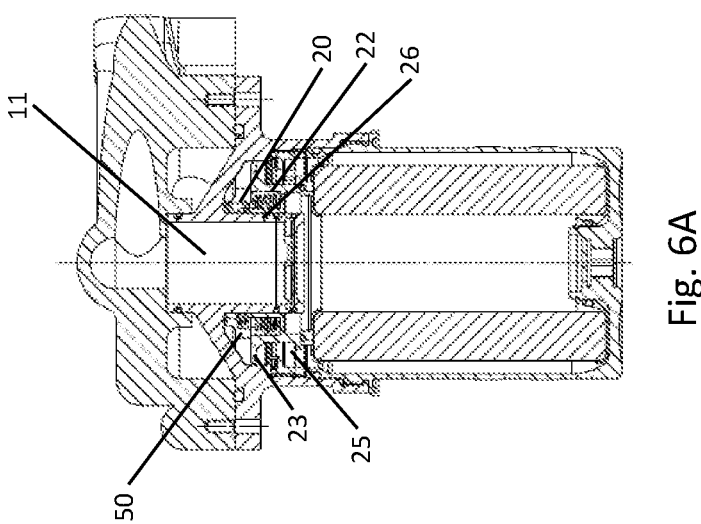

FIG. 6A shows the manifold 1, connector/valve housing 100 and filter bowl 4 assembled as described above.

To remove the filter bowl 4, it is unscrewed from the connector 100 using the thread 101. The filter bowl 4 may also be secured to the connector by a latch (not shown) which is also opened to release the bowl. FIG. 6B shows the assembly as the bowl is being unscrewed. FIG. 6C shows the filter bowl removed from the manifold 1.

The filter bowl 4 contains the filter medium 6 which is in the form of a cylinder with a top part provided with a cap ring 125 provided to add rigidity to the filter medium 6 for attachment of the flow paths and valve assembly parts. In normal operation, when the filter bowl 4 is attached to the manifold 1 via the connector 100 (FIG. 6A), the shut off valve spring 20 is compressed by the attachment of the filter bowl 4 such that the flange 23 of the piston 22 is held out of engagement with the adaptor ring 25. The inlet 26 and outlet axial seals 29 are therefore not in sealing engagement with the piston and the flange 23 and do not, therefore, prevent flow of the fluid from the supply channel into the filter or from the filter to the outlet.

As the filter bowl starts to be unscrewed from the connector (FIG. 6B) this releases the force acting on the valve spring 20 via the piston 22 being pressed by contact with the filter bowl 4 and as the spring 20 expands it forces the piston axially downwards bringing the flange into engagement with the adaptor ring and the outlet seal 29. At the same time, the piston moves to sealingly engage with the inlet seals 26 to thus prevent flow of fluid at the inlet and outlet. Once the shut off valve piston 22 is in a position that the inlet and outlet seals are in proper sealing engagement, the filter bowl 4 can be fully detached (FIG. 6C) without the risk of fluid leakage from the manifold/connector. The geometry of the shut off valve parts and the design of the valve spring are such that the valve in its shut off function will be in its fully sealed closed position before the filter bowl 4 is disconnected. The flange 23 of the piston in engagement with the adaptor ring defines a chamber 50 where the spring 22 is located to protect the spring from fluid in the system and from debris.

The outlet seal 29 being provided on the adaptor ring 25 provides the required outlet sealing for the shut off function and also secures the piston 22 against falling out of the connector/manifold after the bowl 4 is removed.

Thus, a single valve assembly of a piston, springs and seals, mounted inside the filter assembly, performs both a bypass function and a shut off function when required.

The valve assembly of this disclosure can be located inside existing manifold designs and thus does not increase the envelope of the filter assembly. Further, the bypass vale is incorporated within the shut off valve. The valve assembly is relatively simple, small and lightweight and enables simple, quick and less frequent maintenance without fuel loss. Further, the failure of any one valve component will not cause the loss of filter function. The valve assembly is reliable and durable thus reducing the costs and time of maintenance.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

The invention claimed is:

1. A filter assembly comprising:

a manifold having a fluid inlet and a fluid outlet;

a filter housing having a filter medium provided therein, the filter medium defining an inner filter chamber and defining an outer filter chamber between the filter medium and the filter housing, the filter housing being removably attached to the manifold so as to provide a fluid flow path from the inlet into the inner filter chamber, through the filter medium into the outer chamber and out of the outlet;

a valve assembly mounted inside the manifold, the valve assembly comprising:

a shut off valve piston;

a shut off valve spring arranged in engagement with the valve piston to bias the valve piston into a first position;

an adaptor ring located between the shut off valve piston and the filter housing and provided with an annular outlet seal, and wherein the shut off valve piston is provided with a radially extending flange and an inner piston wall configured such that as the filter housing is being detached from the manifold, the shut off valve spring expands to move the shut off valve piston to a shut off position whereby the radially extending flange is in sealing engagement with the adaptor ring and the outlet seal, and the inner piston wall is in sealing engagement with inlet seals such that flow from the fluid inlet and the fluid outlet is shut off from entering the filter housing; and a bypass channel formed in the shut off valve piston between the fluid inlet and the fluid outlet and a bypass valve assembly comprising a bypass valve spool and a bypass valve spring, wherein in its default state, the bypass valve spring biases the bypass valve spool across the bypass channel to prevent flow from the fluid inlet to the fluid outlet via the bypass channel and wherein, when the pressure differential across the bypass valve spool exceeds a predetermined threshold, the pressure acting on the bypass valve spool causes the bypass valve spool to move against the bias of the bypass valve spring and to move away from the bypass channel to open the bypass channel and allow the flow of fluid from the fluid inlet to the fluid outlet via the bypass channel;

wherein the outlet seal is a lip seal.

2. A filter assembly comprising:

a manifold having a fluid inlet and a fluid outlet;

a filter housing having a filter medium provided therein, the filter medium defining an inner filter chamber and defining an outer filter chamber between the filter medium and the filter housing, the filter housing being removably attached to the manifold so as to provide a fluid flow path from the inlet into the inner filter chamber, through the filter medium into the outer chamber and out of the outlet;

a valve assembly mounted inside the manifold, the valve assembly comprising:

a shut off valve piston;

a shut off valve spring arranged in engagement with the valve piston to bias the valve piston into a first position;

an adaptor ring located between the shut off valve piston and the filter housing and provided with an annular outlet seal, and wherein the shut off valve piston is provided with a radially extending flange and an inner piston wall configured such that as the filter housing is being detached from the manifold, the shut off valve spring expands to move the shut off valve piston to a shut off position whereby the radially extending flange in sealing engagement with the adaptor ring and the outlet seal, and the inner piston wall is in sealing engagement with inlet seals such that flow from the fluid inlet and the fluid outlet is shut off from entering the filter housing; and a bypass channel formed in the shut off valve piston between the fluid inlet and the fluid outlet and a bypass valve assembly comprising a bypass valve spool and a bypass valve spring, wherein in its default state, the bypass valve spring biases the bypass valve spool across the bypass channel to prevent flow from the fluid inlet to the fluid outlet via the bypass channel and wherein, when the pressure differential across the bypass valve spool exceeds a predetermined threshold, the pressure acting on the bypass valve spool causes the bypass valve spool to move against the bias of the bypass valve spring and to move away from the bypass channel to open the bypass channel and allow the flow of fluid from the fluid inlet to the fluid outlet via the bypass channel;

the assembly further comprising:

a cap ring mounted to the top of the filter housing.

3. A filter assembly comprising:

a manifold having a fluid inlet and a fluid outlet;

a filter housing having a filter medium provided therein, the filter medium defining an inner filter chamber and defining an outer filter chamber between the filter medium and the filter housing, the filter housing being removably attached to the manifold so as to provide a fluid flow path from the inlet into the inner filter chamber, through the filter medium into the outer chamber and out of the outlet;

a valve assembly mounted inside the manifold, the valve assembly comprising:

a shut off valve piston;

a shut off valve spring arranged in engagement with the valve piston to bias the valve piston into a first position;

an adaptor ring located between the shut off valve piston and the filter housing and provided with an annular outlet seal, and wherein the shut off valve piston is provided with a radially extending flange and an inner piston wall configured such that as the filter housing is being detached from the manifold, the shut off valve spring expands to move the shut off valve piston to a shut off position whereby the radially extending flange in sealing engagement with the adaptor ring and the outlet seal, and the inner piston wall is in sealing engagement with inlet seals such that flow from the fluid inlet and the fluid outlet is shut off from entering the filter housing; and a bypass channel formed in the shut off valve piston between the fluid inlet and the fluid outlet and a bypass valve assembly comprising a bypass valve spool and a bypass valve spring, wherein in its default state, the bypass valve spring biases the bypass valve spool across the bypass channel to prevent flow from the fluid inlet to the fluid outlet via the bypass channel and wherein, when the pressure differential across the bypass valve spool exceeds a predetermined threshold, the pressure acting on the bypass valve spool causes the bypass valve spool to move against the bias of the bypass valve spring and to move away from the bypass channel to open the bypass channel and allow the flow of fluid from the fluid inlet to the fluid outlet via the bypass channel;

wherein the shut off valve spring is located in a blind cavity outside of the path of fluid flow through the assembly.

4. The filter assembly of claim 1, further comprising a supply chamber between the fluid inlet and the inner filter chamber.

5. The filter assembly of claim 4, further comprising a supply channel fluidly connecting the supply chamber and the inner filter chamber.

6. The filter assembly of claim 1, further comprising an outlet chamber between the outer filter chamber and the fluid outlet.

7. The filter assembly of claim 1, further comprising sealing means between the manifold and the filter housing.

8. A fuel filter arranged between a fuel supply and a fuel application and comprising:

a filter assembly as recited in claim 1, wherein the inlet is arranged to be connected to the fuel supply and the outlet arranged to be connected to the fuel application.

9. The filter assembly of claim 2, further comprising a supply chamber between the fluid inlet and the inner filter chamber.

10. The filter assembly of claim 9, further comprising a supply channel fluidly connecting the supply chamber and the inner filter chamber.

11. The filter assembly of claim 2, further comprising an outlet chamber between the outer filter chamber and the fluid outlet.

12. The filter assembly of claim 2, further comprising sealing means between the manifold and the filter housing.

13. A fuel filter arranged between a fuel supply and a fuel application and comprising:

a filter assembly as recited in claim 3, wherein the inlet is arranged to be connected to the fuel supply and the outlet arranged to be connected to the fuel application.

14. The filter assembly of claim 3, further comprising a supply chamber between the fluid inlet and the inner filter chamber.

15. The filter assembly of claim 14, further comprising a supply channel fluidly connecting the supply chamber and the inner filter chamber.

16. The filter assembly of claim 3, further comprising an outlet chamber between the outer filter chamber and the fluid outlet.

17. The filter assembly of claim 3, further comprising sealing means between the manifold and the filter housing.

18. A fuel filter arranged between a fuel supply and a fuel application and comprising:

a filter assembly as recited in claim 3, wherein the inlet is arranged to be connected to the fuel supply and the outlet arranged to be connected to the fuel application.

* * * * *